United States Patent [19]

Tai

[11] Patent Number: 4,962,899

[45] Date of Patent: Oct. 16, 1990

[54] DUAL DIRECTION TRANSMISSION DEVICE OF A VIDEO CASSETTE REWINDER

[76] Inventor: David Tai, 1st Floor, No. 17, Lane 180, Ho Chiang Street, Taipei, Taiwan

[21] Appl. No.: 427,561

[22] Filed: Oct. 27, 1989

[51] Int. Cl.⁵ ............................................. G11B 15/32
[52] U.S. Cl. ..................................... 242/201; 360/96.3
[58] Field of Search ............... 360/96.3; 242/201, 202, 242/203, 204, 205

[56] References Cited

U.S. PATENT DOCUMENTS

| | | | |
|---|---|---|---|
| 3,874,614 | 4/1975 | Flygstad | 242/200 X |
| 3,924,823 | 12/1975 | Cohen et al. | 242/198 |
| 4,009,846 | 3/1977 | Coruzzi | 242/201 |
| 4,485,416 | 11/1984 | Walters | 360/96.3 X |
| 4,692,825 | 9/1987 | Debaudringhien | 360/96.3 |

Primary Examiner—Daniel P. Stodola
Assistant Examiner—William G. Battista, Jr.
Attorney, Agent, or Firm—Kirschstein, Ottinger, Israel & Schiffmiller

[57] ABSTRACT

A dual direction transmission device of a video cassette rewinder includes a pivoting member pivotably mounted on a base of a video cassette rewinder, a motor mounted at one end of the pivoting member. There are three pulleys in which two of the pulleys are coaxially and rotatably mounted at a first position on the base, and the other pulley is rotatably mounted at a second position on the base. There are two belts operatively connecting those pulleys. There are two dual direction transmission mechanism operatively mounted between two spindles and those pulleys respectively. Thus, the dual direction transmission device may occupy less space.

1 Claim, 2 Drawing Sheets

DUAL DIRECTION TRANSMISSION DEVICE OF A VIDEO CASSETTE REWINDER

FIELD OF THE INVENTION

The invention relates to a video cassette rewinder, in particular to a dual direction transmission device of a video cassette rewinder.

BACKGROUND OF THE INVENTION

A dual direction transmission device of the prior art typically includes a dual direction selecting mechanism which is driven by a motor through a pulley and belt transmission. Two spindles are operatively connected with said dual direction selecting mechanism respectively. Thereby, either one of the spindles is subject to the direction of rotation of the motor, whereby the other spindle will be freely rotatable.

The dual direction transmission device of the prior art is defective in that the dual direction selecting mechanism must be mounted away from said two spindles, thereby occupying a non-negligible space.

In view of this, a primary object of the invention is to solve said defect, that is, the object of the invention is to change the structure of the dual direction selecting mechanism, whereby it may be mounted on those two spindles in order to minimize the space occupied thereby.

SUMMARY OF THE INVENTION

The dual direction transmission device includes a pivoting member pivotably mounted on the base of the rewinder; a motor fixed at one end of said pivoting member; a first pulley fixedly mounted on the rotating shaft of said motor; a second pulley pivotably mounted at the first position of the base of said rewinder; a third pulley coaxially connecting said first pulley; and a fourth pulley pivotably mounted at the second position of said rewinder. A first belt connects said first pulley and second pulley. A second belt connects said third pulley and fourth pulley. A first spindle is coaxially and pivotably mounted on said third pulley. A second spindle is coaxially and pivotably mounted on the fourth pulley. A first dual direction selecting mechanism is mounted between said third pulley and fourth pulley; and the second dual direction selecting mechanism is mounted between said fourth pulley and second spindle.

The invention has made a proper improvement and arrangement for the dual direction selecting mechanism in company with the pulleys and belts, whereby the whole dual direction transmission device may occupy less space.

DIRECTION OF THE DRAWINGS

FIG. 1 is an exploded perspective view, showing each element of the present invention; and FIG. 2 is an assembled perspective view, showing the configuration of the present invention.

DETAILED DESCRIPTION OF THE PREFERRED EMBODIMENT

Figure 1:
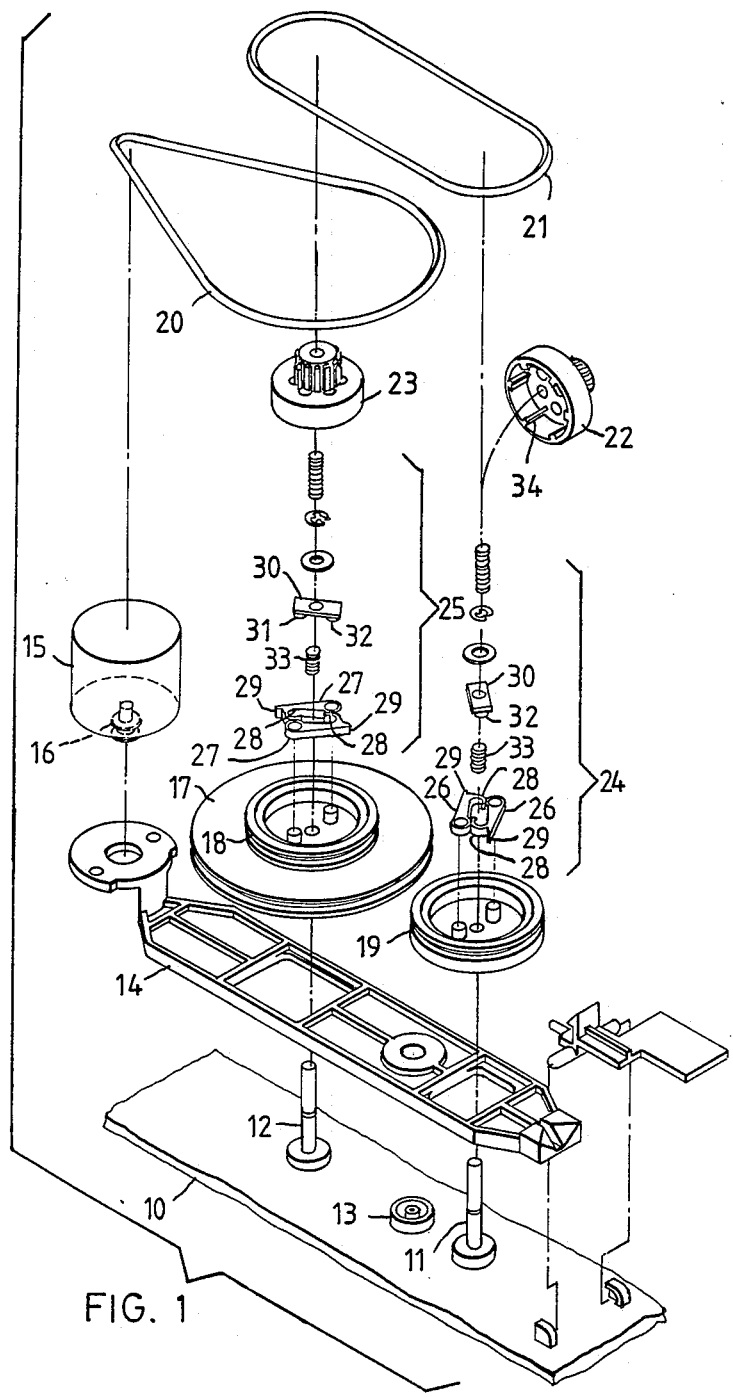
Figure 2:
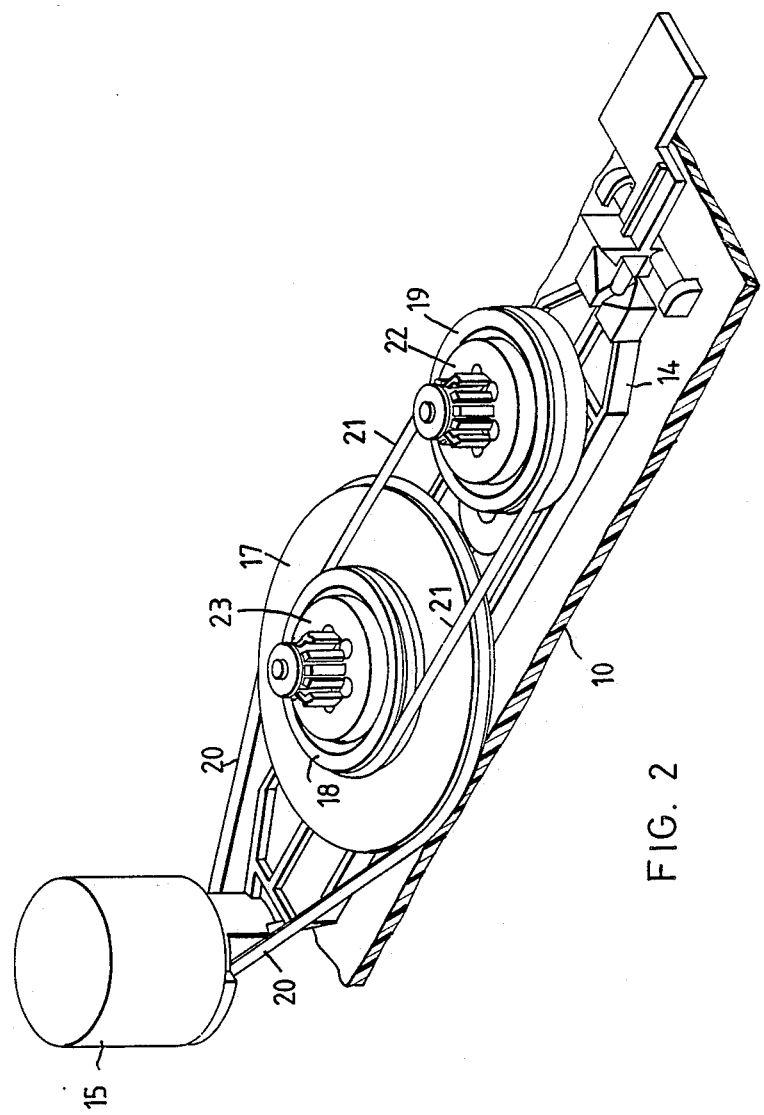

Referring to FIG. 1, the base 10 is fixedly equipped with three support shafts 11, 12, 13 which are co-linear. A pivoting member 14 is pivotably mounted on the support shaft 13. A motor 15 is fixedly mounted at one end of said pivoting member 14. A pulley 16 is mounted on a rotating shaft of the motor 15. Two pulleys 17, 18 are coaxially formed together and pivotably mounted on the support shaft 12. A pulley 19 is pivotably mounted on another support shaft 11. A belt 20 is wound about pulleys 16, 17.

Two spindles 22, 23 are pivotably mounted on the support shafts 11, 12 individually. A dual direction selecting mechanism 24 is mounted between the spindle 22 and pulley 19. Another dual direction selecting mechanism 25 is mounted between the other spindle 23 and pulley 18. However, the dual direction selecting mechanism itself is not a feature of this invention.

Each dual direction selecting mechanism includes two first pivoting members 26, 27 each having one pivotably mounted on respective shafts on the pulleys 19 and 18 respectively, and having an opposite end provided with a second pivoting member 30 for each mechanism is equipped with pins 31, 32 at both its ends. A spring 33 is positioned between each pivoting member 30 and the support shaft 11 or 12. A friction force is produced between each second pivoting member 30 and the support shaft 11 or 12. When either pulley 18 or 19 is rotated in a forward or reverse rotation, the second pivoting member 30 will enable the two first pivoting members 26, 27 to open outward, whereby the claw 29 of said first members 26, 27 will mesh with the teeth 34 of the spindle 22 or 23. The claw 29 separates from the teeth 34 due to the power transmitted through the pulley to the spindle or contracting inward. Thus, the pivoting members 26, 27 and 30 of the two dual direction selecting mechanisms are installed in opposite directions relative to each other. Either of the spindles 22 or 23 may be selectively driven into rotation subject to the change in the direction of rotation of motor 15. The other spindle 23 or 22 will be in idle rotation.

The primary features of the invention are that the whole dual direction transmission device may occupy a minimal space, whereby the housing of the rewinder can be made smaller and more esthetic.

I claim:

1. A dual direction transmission device of a video cassette rewinder, comprising:
a pivoting member pivotably mounted on a base of a video cassette rewinder; a motor fixedly mounted at one end of the pivoting member and having a drive shaft; a first pulley fixedly mounted on the drive shaft of said motor; a second pulley rotatably mounted at a first position on the base of said video cassette rewinder; a third pulley coaxially connected with said first pulley; a fourth pulley rotatably mounted at a second position on the base of said video cassette rewinder; a first belt operatively connected between said first pulley and said second pulley; a second belt operatively connected between said third pulley and said fourth pulley; a first spindle coaxially and rotatably mounted on said third pulley; a second spindle coaxially and rotatably mounted on said fourth pulley; a first dual direction selecting mechanism mounted between said third pulley and said first spindle; and a second dual direction selecting mechanism mounted between said fourth pulley and said second spindle.

* * * * *